United States Patent

Okano

[15] 3,681,561
[45] Aug. 1, 1972

[54] TURNTABLE TYPE WORK FEEDING METHOD OF FEEDING MULTIPLE-CONTACT ELECTRIC COMPONENTS FOR CONTACT WELDING THEREOF AND APPARATUS FOR PERFORMING SUCH METHOD

[72] Inventor: Teruo Okano, 40-28-404, 2-chome, Shimouma, Segatgaya-ku, Tokyo, Japan

[22] Filed: Aug. 11, 1971

[21] Appl. No.: 170,822

[30] Foreign Application Priority Data

Aug. 24, 1970 Japan..........................45/73493

[52] U.S. Cl. ......................219/80, 219/87, 219/159
[51] Int. Cl. .............................................B23k 11/10
[58] Field of Search......219/80, 87, 79, 91, 117, 158, 219/159

[56] References Cited

UNITED STATES PATENTS 3,430,028 2/1969 Gofouth et al..................219/87
3,239,644 3/1966 Wyborg et al. ................219/80

Primary Examiner—J. V. Truhe
Assistant Examiner—B. A. Reynolds
Attorney—Albert H. Oldham et al.

[57] ABSTRACT

In fabrication of relatively small electric components and particularly of multiple-contact electric components having three or more electric contacts arranged in a straight line, it is now possible to perform contact welding operation efficiently by a turntable type work feeding system, in which the step of presenting a work to the contact welding unit by turntable means and the step of rectilinearly moving the work relative to the contact welding unit are repeated. The work feeding turntable structure is supported on a base plate and laterally movable by thrust means operably connected therewith.

6 Claims, 4 Drawing Figures

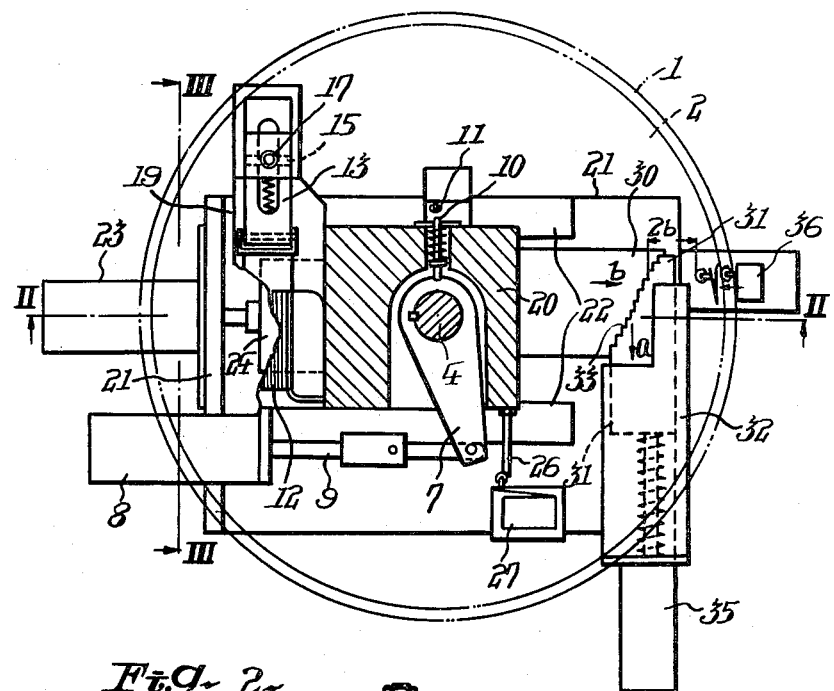

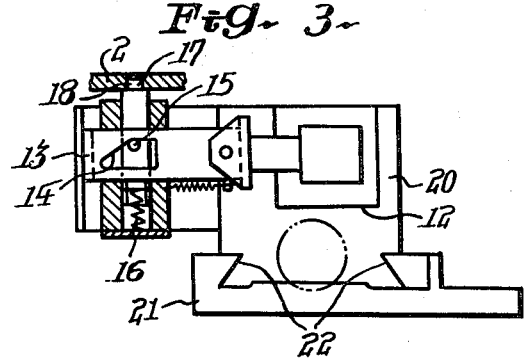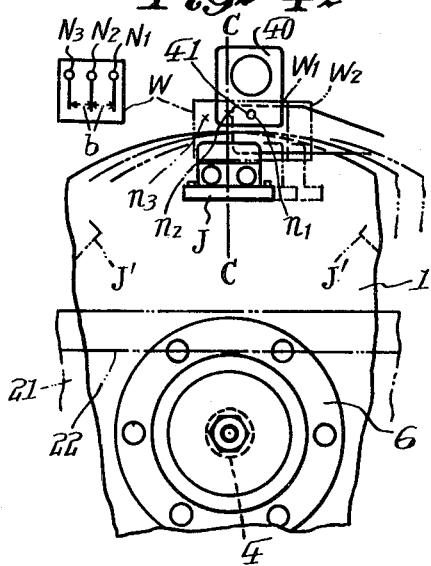

TURNTABLE TYPE WORK FEEDING METHOD OF FEEDING MULTIPLE-CONTACT ELECTRIC COMPONENTS FOR CONTACT WELDING THEREOF AND APPARATUS FOR PERFORMING SUCH METHOD

This invention relates to a method of and apparatus for efficiently fabricating small electric components having electric contacts and more particularly those having each three or more contacts arranged in a straight line along one end portion of the component.

As is well known, the turntable type work feeding is the most advantageous as an efficient procedure for presenting works and more accurately their welding points successively to the contact welding unit set in a fixed position. In the past, however, such feeding method could be utilized only in cases where a single contact or at most two contacts are to be welded to each of works, which are circumferentially arranged on the turntable. The reason for this is that the works on the turntable and particularly their contact carrying portions were naturally caused to move arcuately relative to the contact welding unit and thus it was impossible to present all of three or more straightly arranged welding points on each work accurately to the contact welding unit.

The present invention is intended to overcome the difficulty described above and has for its object the provision of a novel turntable type work feeding method which enables efficient fabrication of electric components having a multitude of contacts arranged in a straight line while taking full advantage of the inherent character of the turntable system which allows convenient supply and removal of works.

Another object of the present invention is to provide an apparatus for carrying out the method described above.

To attain these objects, the present invention provides means for moving a work rectilinearly relative to the contact welding unit after the work has been set into a predetermined position relative to the contact welding unit by rotation of the turntable. With the aid of such means a multitude of contacts can be welded to the work successively at respective straightly arranged points thereon.

To enable the above welding operation to be performed in a continuous manner, the present invention further provides means for restoring the work feeding apparatus to its initial position after each work has been moved rectilinearly over a predetermined total distance. With the aid of this means, works can be fed into welding position one after another in a consecutive manner.

With the intention of realizing such restoring means, the present invention has for its further object the provision of a combination of a turntable supported on a slide block laterally movably mounted on a base plate, means for rotating said turntable each time through a predetermined angle, and slide block thrusting means secured to said base plate for laterally moving said slide block along track means provided on said base plate.

Yet another object of the invention is to provide a guide plate and actuating means therefor for allowing said slide block to move laterally stepwise by predetermined equal distances.

Another object of the invention is to provide indexing means for presenting the works mounted on the turntable successively to the contact welding unit at all times in a predetermined relation therewith.

Yet another object of the invention is to provide restoring means for enabling automatic repetition of the angular rotation of said turntable and the lateral movement of said slide block.

These and other objects, features and advantages of the present invention will become apparent from the following description when taken in conjunction with the accompanying drawings, which illustrate a preferred embodiment of the invention and in which:

FIG. 1 is a partly cutaway plan view of the embodiment, substantially taken along the line I—I in FIG. 2, and showing the turntable drive, slide block thrusting means and associated parts of the embodiment, with the turntable and index plate indicated by the phantom lines;

FIG. 2 is a vertical cross-sectional side elevation, substantially taken along the line II—II in FIG. 1, showing the turntable drive, slide block and associated parts;

FIG. 3 is a side elevation of the bottom portion of the apparatus, viewed from the line III—III in FIG. 1, with the indexing means shown partly in section; and FIG. 4 is an explanatory plan view showing the multiple-contact welding process of the invention.

Referring to the drawings and first to FIGS. 1 and 2, reference numeral 1 indicates a work feeding turntable; and 2 indicates an index plate connected with the turntable 1 by pin means 3 and formed with a plurality of guide apertures 18 at regular intervals corresponding to the spacing of work fixing jigs J (see FIG. 4), which are arranged at regular intervals along the periphery of the turntable 1. The turntable and index plate is integrally secured to a rotary head 6 mounted on a rotative shaft 4 by way of a one-way clutch 5.

The rotary head 6 is supported, together with the shaft 4, in a slide block 20 mounted on a base plate 21. The shaft 4 is rotatably supported at the bottom by a bearing fitted in the slide block 20 and a lever arm 7 is fixed to the shaft 4 intermediate its ends and extends exteriorly through a side opening formed in the slide block 20. At its extremity the lever arm is connected with a piston rod 9 slidably fitted in an air cylinder 8, which is secured to the side of slide block 20. The lever arm 7 is formed on its hub portion with a recess into which a pin 10 is normally biased by spring means. A microswitch 11 is disposed opposite to the other end of the pin 10.

Secured to one side of the slide block 20 are a solenoid 12 (FIG. 3) and an index device including a cam plate 13 operably connected with the plunger of said solenoid and a locating pin 17, which is normally urged upwardly by a compression spring 16 to fit in any aligned one of the guide apertures 18 formed in the index plate 2 to maintain the angular position of the turntable. The locating pin 17 has a pair of lateral projections 15 which are accommodated in respective side openings formed in the cam plate 13. With this arrangement, when the solenoid 12 is operated to move the cam plate to the right as viewed in FIG. 3, the locating pin 17 is lowered and held in its bottom position under the action of the inclined edges 14 of the respective side openings in the cam plate to allow rotation of the index plate and turntable. Upon deenergization of solenoid 12, the cam plate is restored to its normal position under the bias of a tension spring associated therewith, thus releasing the constraining action of the cam plate upon the locating pin 17 to allow the latter to be pressed against the index plate under the bias of compression spring 16.

Upon completion of the welding operation upon one of the works set on the turntable, the contact welding unit produces an electric pulse signal effective to cause the solenoid to operate so that the locating pin 17 previously fitted in one of the guide apertures 18 formed in the index plate is withdrawn therefrom and at the same time the air cylinder 8 is actuated to turn the lever arm 7 clockwise as viewed in FIG. 1. The turning movement of the lever arm 7 and hence of the rotative shaft 4 causes the pin 10 to be forced radially outward to close the microswitch 11 and the latter produces an electric pulse for de-energization of solenoid 12 so that the locating pin 17 is pressed against the underside of the index plate under the bias of compression spring 16, as described hereinbefore, and subsequently is plunged under the same spring bias into the next following guide aperture as soon as the latter is brought into alignment with the locating pin 17, when the air cylinder 8 is reversed in direction of action so that the rotation of the turntable is terminated with the next work positioned in the contact welding station. On this occasion, the lever arm 7 is turned together with the rotative shaft 4 in the opposite direction under the action of air cylinder 8 independently of the turntable and index plate owing to the provision of the one-way clutch 5 and thus restores its initial position shown in FIG. 1.

The arrangement and construction described above is itself known in the art of a turntable work feed system. In the illustrated embodiment, however, the slide block 20, which supports the work feeding turntable structure including turntable 1 and means for rotating and indexing the same, is laterally movably mounted on the base plate by track means, for example, in the form of dovetail groove 22 formed in the base plate 21. As shown, the slide block 20 has an extended portion 24 with which a slide block thrusting unit, in this example taking the form of an air cylinder 23 secured to the base plate 21, is operably connected to serve the purpose of rectilinearly moving the slide block along the track 22. With this arrangement, the work feeding turntable structure, supported by the slide block 20, can be laterally moved while maintaining the angular position of the turntable by means of locating pin 17.

Referring to FIG. 4, reference character J indicates a jig employed to hold a work in place along the periphery of turntable 1. The jig J and other identical jigs J' are arranged on the turntable at regular intervals along the periphery thereof. As will readily be understood, the spacing of the jigs J, J' corresponds to that of guide apertures 18 formed in the index plate 2.

Reference character W indicates a work to be welded with a multitude of contacts (in this example three contacts $N_1$, $N_2$ and $N_3$) and as shown it is fixed in place on the turntable by means of the jig J in a manner so that the contact welding points $n_1$, $n_2$ and $n_3$ on the work W lie on a straight line at right angles to the line of diameter C—C of the turntable extending through the jig J. Each turning or indexing movement of the turntable is terminated by the indexing means when the line of diameter C—C extending through the jig J, which supports a work to be welded with contacts, has reached a position at right angles to the track 22, and the turntable is fixed in such position.

Reference numeral 40 indicates a contact welding unit having a working point 41. The welding unit 40 is so arranged that its working point 41 is placed opposite the foremost one of the contact welding points on the work W when the slide block is in its initial position as assumed before any lateral movement is imparted thereto and when the turntable 1 has come to rest at the angular relation described above. In cases where the slide block is moved successively to the right from the starting position C—C, as in the embodiment shown, first the rightmost one $n_1$ of the contact welding points is presented to the working point 41 of the welding unit, as shown. Again in this embodiment, the work W having three welding points $n_1$, $n_2$ and $n_3$ is firmly held in a position such that the intermediate welding point $n_2$ lies on the line of diameter C—C and the working point 41 of the contact welding unit is set in a position spaced rightward from the line C—C by a distance equal to the spacing b between the welding points.

After completion of the welding work on the rightmost point $n_1$, the slide block thrusting unit 23 is intermittently operated to move the slide block rightward along the track 22 each time by a distance equal to the spacing b. In this manner, work W is successively moved rectilinearly to the right by distances each equal to the spacing b, together with the turntable and the associated jig, as indicated by $W_1$ and $W_2$ in FIG. 4. It will be readily understood that the welding unit operates in timed relation with the work movement to weld three identical contacts $N_1$, $N_2$ and $N_3$ to the work W at the regular intervals of b.

To effect such stepwise lateral movement of the slide block, the apparatus shown is provided with a fixed pitch lateral feed mechanism described below.

Referring again to FIGS. 1 and 2, reference numeral 30 indicates a step plate secured to the slide block 20 and extending therefrom in the direction in which the slide block is to be laterally moved. The step plate has a stepped end normally pressed against the adjacent end of a guide plate 31 under the action of air cylinder 23. The guide plate 31 is formed at the end with a series of steps 33 complemental to those formed on the adjacent end of the step plate and is in meshing or interlocking engagement therewith.

Reference numeral 32 generally indicates guide plate actuating means for example, including an air cylinder 35 and an appropriate drive mechanism, for example, in the form of a rack and pinion mechanism (not shown) and operable to drive the guide plate 31 in the direction indicated by the arrow a. The movement of the guide plate in this direction allows the step plate 30 to move in the direction of the arrow b to follow the guide plate 31. This means that the slide block 20 can be laterally moved as desired by a distance definitely proportional to that of movement of the guide plate 31.

Reference numeral 36 indicates a microswitch forming part of the restoring means of the apparatus and adjustable in the direction of lateral movement of the slide block 20. When the total amount of lateral movement of the step plate 30 reaches a predetermined value, its contacting end acts upon the microswitch 36 to close it so that the pulse produced by the contact welding unit upon completion of its welding operation upon each piece of work is effective to reverse the direction of action of the air cylinder 23 to retract the slide block together with the step plate 30 secured thereto. Following the retracting or leftward movement of the step plate 30, the guide plate 31 restores its initial position under the action of an appropriate biasing spring or air cylinder 35. When the slide block 20 is restored to its normal position, another microswitch 27 forming part of the restoring means of the work feeding apparatus is operated by an arm 26 extending from the adjacent side of slide block 20 so that the direction of action of the air cylinder 23 is again reversed to press the step plate 30 against the guide plate and the slide block 20 is maintained in its normal position until the guide plate actuating means 32 is again operated.

Before starting the apparatus for welding operation, the slide block 20 is in its normal position shown in FIG. 1 and the foremost one $n_1$ of the contact welding points on the next work W to be welded with contacts is aligned with the working point 41 of the welding unit as shown in FIG. 4. In this condition, the guide plate actuating means 32 is adjusted so as to act in operation to drive the guide plate in the direction of a (FIG. 1) each time by a distance which corresponds to a number of times the length of each of the steps 33 and allows the step plate to effect a lateral movement corresponding in amount to the spacing b between the welding points $n_1$, $n_2$ and $n_3$ of the work W. Also, microswitch 36 is adjusted relative to the contacting end of the step plate 30 so as to give a spacing of $2b$ therebetween, as indicated in FIG. 1. Subsequently, after the welding operation has been started, the guide plate actuating means 32 is operated, under control of the pulse produced by the welding unit each time when a single welding work has been completed, to allow the slide block 20 to move laterally a distance of b for another welding work on point $n_2$. When the rearmost welding point $n_3$ reaches the working point 41 of the welding unit after the completion of the second welding action, the microswitch 36 is closed and, under control of the pulse produced at the end of the third welding action, the turntable is started to rotate to carry the work finished to the point of work removal while at the same time the direction of action of the air cylinder 23 is reversed as described before to restore the slide block and the fixed pitch lateral feed mechanism to their initial position. On the other hand, another work previously fixed on the next following jig is presented to the contact welding unit with the aid of the indexing means in the manner described hereinbefore.

In the embodiment shown and described herein, it will be readily recognized that the position of the contact welding unit relative to the axis of the turntable shaft can be freely selected according to the location of the work fixing jigs on the turntable and that the contacting end faces of the step and guide plates of the fixed pitch lateral feed mechanism may be made inclined at suitable angles if desired.

Various modes of carrying out the invention are contemplated as being within the scope of the following claims particularly pointing out and distinctly claiming the subject matter which is regarded as the invention.

What is claimed is:

1. A turntable type work feeding apparatus for feeding multiple-contact electric components for contact welding thereof, comprising a laterally movable turntable for presenting to a contact welding unit the foremost one of contact welding points on a work mounted on said turntable by rotating movement thereof, means for presenting said contact welding points sequentially to said contact welding unit by moving said turntable laterally forwardly relative to said contact welding unit while maintaining the angular position of said turntable, and means for moving said turntable laterally in an opposite direction to restore its initial position upon completion of welding of all contact welding points on said work.

2. An apparatus as claimed in claim 1, further comprising a work feeding turntable structure comprising said turntable, a slide block supporting said work feeding turntable structure, a base plate supporting said slide block by a track means arranged upward of said slide block for allowing its lateral displacement in relation to said contact welding unit, and driving means connected to said slide block for driving the latter.

3. An apparatus as claimed in claim 2, wherein means for rotating the said turntable of said work feeding turntable structure is mounted on said slide block.

4. An apparatus as claimed in claim 2, in which said turntable structure is provided with indexing means comprising an index plate connected with said turntable for rotation therewith and formed with a plurality of equally spaced guide apertures, and a locating pin normally biased toward said index plate by spring means for fitting engagement with said guide apertures and constrainable in the direction of withdrawal there-from under control of a signal produced by said contact welding unit each time when the latter has completed its contact welding operation with a single work, said locating pin being releasable with the restarting of rotation of said turntable.

5. An apparatus as claimed in claim 2, further comprising restoring means including an electric switch adapted to be closed when said slide block has been moved laterally by a predetermined total distance and operable to restore said slide block to its initial position under control of a signal produced subsequently when the final contact welding work has been completed while on the other hand rotating the turntable through a predetermined angle.

6. A turntable type work feeding apparatus for feeding multiple-contact electric components for contact welding thereof, comprising a laterally movable turntable for presenting to a contact welding unit the foremost one of contact welding points on a work mounted on said turntable by rotating movement thereof, means for presenting said contact welding points sequentially to said contact welding unit by moving said turntable laterally forwardly relative to said contact welding unit while maintaining the angular position of said turntable, and means for moving said turntable laterally in an opposite direction to restore its initial position while on the other hand rotating said turntable through a predetermined angle for removal therefrom of the finished work, upon completion of welding of all contact welding points on said work.

* * * * *

UNITED STATES PATENT OFFICE
CERTIFICATE OF CORRECTION

Patent No. 3,681,561                    Dated August 1, 1972

Inventor(s) Teruo Okano

It is certified that error appears in the above-identified patent and that said Letters Patent are hereby corrected as shown below:

On the title page of the above patent, below [72] Inventor: Teruo Okano 40-28-404, 2-chome, Shimouma, Segatgaya-ku, Tokyo, Japan, insert

[73] Assignee: Kabushiki Kaisha Fuji Kogyosho
     Yokohama, Japan

Signed and sealed this 2nd day of January 1973.

(SEAL)
Attest:

EDWARD M. FLETCHER, JR.　　　　　　　　ROBERT GOTTSCHALK
Attesting Officer　　　　　　　　　　　Commissioner of Patents